United States Patent [19]

Morisawa

[11] Patent Number: 4,989,109
[45] Date of Patent: Jan. 29, 1991

[54] APPARATUS FOR ACCURATELY POSITIONING A MAGNETIC RECORDING AND REPRODUCING HEAD

[75] Inventor: Tahei Morisawa, Tokyo, Japan

[73] Assignee: Asahi Kogaku Kogyo Kabushiki Kaisha, Tokyo, Japan

[21] Appl. No.: 204,728

[22] Filed: Jun. 10, 1988

[30] Foreign Application Priority Data

Jun. 12, 1987 [JP] Japan .................................. 62-146660

[51] Int. Cl.[5] .............................. G11B 5/55; G11B 5/56
[52] U.S. Cl. ...................................... 360/106; 360/109
[58] Field of Search ............... 360/106, 105, 104, 109, 360/77.1, 77.2; 358/906

[56] References Cited

U.S. PATENT DOCUMENTS

| 3,924,268 | 12/1975 | McIntosh et al. | 360/78.05 |
|---|---|---|---|
| 4,514,773 | 4/1985 | Süsz | 360/77.02 |
| 4,691,252 | 9/1987 | Okada et al. | 360/78.05 |
| 4,713,707 | 12/1987 | Heizmann | 360/109 |
| 4,716,481 | 12/1987 | Tezuka | 360/106 |
| 4,733,315 | 3/1988 | Okuyama et al. | 360/106 |
| 4,747,003 | 5/1988 | Tezuka | 360/109 X |
| 4,763,214 | 8/1988 | Shibaike | 360/106 |
| 4,811,139 | 3/1989 | Maeda | 360/109 |
| 4,814,908 | 3/1989 | Schmitz | 360/77.02 |
| 4,825,313 | 4/1989 | Moribe et al. | 360/77.02 |

Primary Examiner—David J. Severin
Attorney, Agent, or Firm—Sandler, Greenblum & Bernstein

[57] ABSTRACT

A magnetic disk recording and reproducing apparatus is provided having a carriage which supports a magnetic head moving in radial directions about a magnetic disk which is rotatably supported on a body of the apparatus, a cam which is rotatable about a rotational shaft to control the radial position of the magnetic disk, an intermittent rotation mechanism which intermittently rotates the cam by a predetermined angular displacement, a click gear which drives the cam, a click lever which is provided, on one of its ends, a pawl which can disengageably engage with the click gear in order to restrict the angular position of the click gear, a fine adjustment member which movably supports one end of the click lever, and a driving device for moving the fine adjustment member in order to adjust the angular position of the click gear, in accordance with the track position of the magnetic head relative to the magnetic disk.

11 Claims, 5 Drawing Sheets

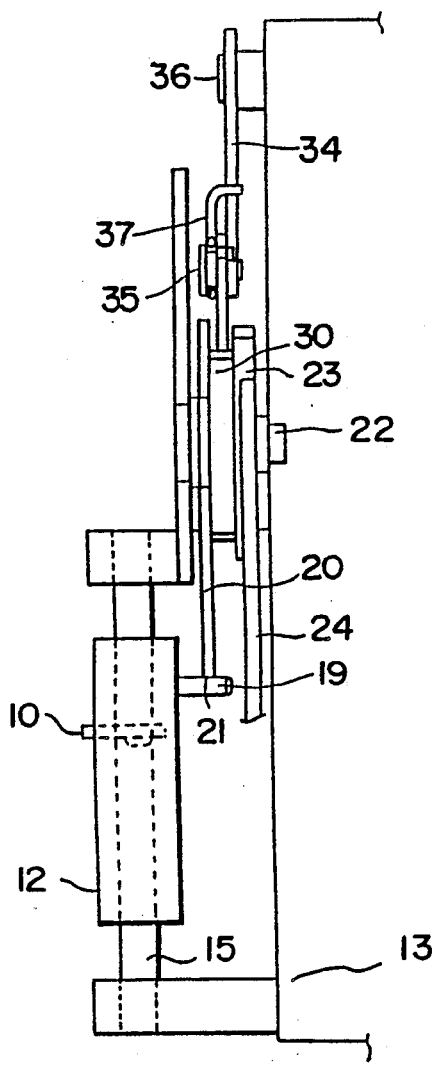
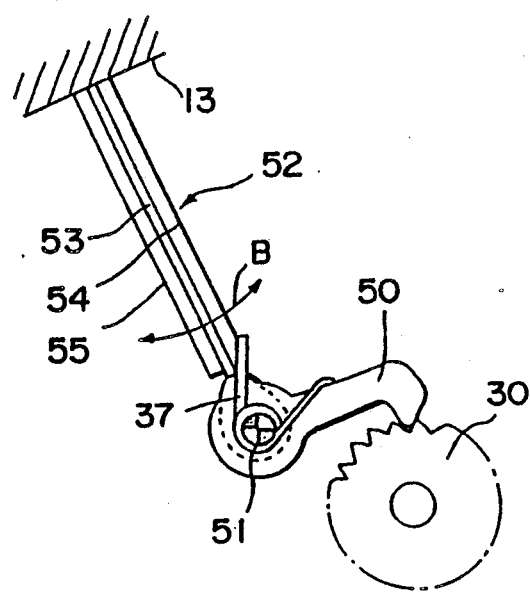
Fig. 2
Fig. 3

APPARATUS FOR ACCURATELY POSITIONING A MAGNETIC RECORDING AND REPRODUCING HEAD

BACKGROUND OF THE INVENTION

1. Field of the Invention

The present invention relates to an apparatus for recording and reproducing information on a magnetic disk, and more precisely, to a magnetic disk recording and reproducing apparatus which has a position adjusting servo-mechanism for a magnetic recording and reproducing head in the apparatus.

2. Description of Related Art

In conventional magnetic disk recording and reproducing apparatus such as an electronic still camera or a floppy disk drive, a magnetic head is moved in radial directions of the magnetic disk in a stepped fashion by an intermittently moving device, to successively trace a large number of concentric recording tracks.

FIG. 7 shows, in from elevation the internal construction of a known magnetic disk recording and reproducing apparatus.

In FIG. 7, a recording and reproducing magnetic head 10 is secured to a generally L-shaped carriage 12 through a piezoelectric element 11. The piezoelectric element 11 comprises a number of laminated piezoelectric plate elements, so that when a voltage is applied between terminal electrodes of the piezoelectric element 11, the latter deforms in thickness l thereof, depending on the polarity and value of the voltage.

A carriage 12 is slidably attached to parallel guide rods 14 and 15 provided on a body 13 of the magnetic recording and reproducing apparatus so as to move the magnetic head 10 along the guide rods. The direction of movement of the carriage 12 corresponds to the direction of movement of the magnetic head 10 which moves above and along the plane of a magnetic disk D, which is supported by a rotational shaft 17 of a magnetic disk driving motor 16, in the radial directions of the magnetic disk. The guide rod 14 is provided with a compression coil spring 18 which is wound around the guide rod 14 to continuously bias the carriage 12 so as to urge the latter far away from the magnetic disk driving motor 16.

Above the carriage 12 in FIG. 7, is a plate cam 20 rotatably mounted to the body 13 through a shaft 22. The plate cam 20 has a peripheral cam surface 21 against which a pin 19, provided on the carriage 12, abuts with the help of the compression coil spring 18. The plate cam 20 has a ratchet gear 23 and a click gear 30 which are both coaxial to the plate cam 20 so as to rotate together.

The ratchet gear 23 is engaged by a pawl 24a which is formed on the front end of a feed lever 24. The feed lever 24 has an elongated hole 24b which is formed at an intermediate portion thereof and which extends substantially in parallel with the guide rod 14. A pin 25, which is provided on the body 13, is fitted in the elongated hole 24b, so that the feed lever 24 can rotate and linearly move. The linear movement of the feed lever 24 is performed by a plunger solenoid 26 which is rotatably connected to the lower end of the feed lever in FIG. 7. The feed lever 24 is continuously biased by a tension spring 27 which is provided between and connected to a pin 13a provided on the body 13 and an arm 24c which is formed on the feed lever 24, so that the ratchet pawl 24a is urged into engagement with the ratchet wheel 23.

Thus, when the plunger solenoid 26 is activated with one pulse, one reciprocal movement of the feed lever 24 in the direction parallel with the guide rod 14 takes place to rotate the ratchet wheel 23 by one pitch corresponding to one tooth of the ratchet gear 23 in the clockwise direction in FIG. 7. Numerals 28 and 29 designate stop pins which are provided on the body 13 to restrict the upper and lower terminal ends of the movement of the feed lever 24.

A click gear 30 is engaged by a click pawl 31a which is formed at the front end of a click lever 31 to stop the rotation of the click gear 30 and accordingly, the plate cam 20 at every pitch (tooth) of the click gear 30. The click lever 31 is pivoted at its rear end to a body 13 through a shaft 32 and has a torsion spring 33 provided between the click lever 31 and the body 13 to bias the click lever 31, so that the click pawl 31a comes into engagement with the click gear 30. The click pawl 31a successively comes into the tooth grooves between the tooth threads of the click gear 30 when the click gear 30 rotates in the clockwise direction to intermittently hold the click gear at a predetermined pitch.

The apparatus shown in FIG. 7 operates as follows.

Upon recording and reproducing the magnetic disk D, the plunger solenoid 26 is actuated a predetermined number of times to rotate the plate cam 20 by a predetermined angular displacement in the clockwise direction in order to move the carriage 12, so that the magnetic head 10 is brought into a predetermined position in which the magnetic head 10 is located above a desired track of the magnetic disk D. This position will be referred to as an on-track position. The position of the magnetic head 10 is determined in accordance with the angular position of the plate cam 20, which is restricted by the engagement of the ratchet pawl 24a in the ratchet gear 23.

In the known apparatus mentioned above, the magnetic head can not usually be stopped at a constant and desired position (on-track position) due to mechanical and physical errors of the head actuating mechanism and the magnetic disk, etc., as shown in FIG. 4. In FIG. 4, the abscissa represents the track number, and the ordinate represents the deviation, i.e. the amount of off-track of the magnetic head from a reference position. As shown in FIG. 4, the magnetic head can not be precisely brought into the on-track position, resulting in read errors, especially when a recording and reproducing are performed by different machines.

To eliminate the problem mentioned above, the piezoelectric element 11 serves as a servo-mechanism for adjusting the position of the magnetic head. The piezoelectric element 11 changes in thickness l thereof in accordance with the direction of the current flow and the voltage is provided between the magnetic head 10 and the carriage 12, so as to realize an accurate on-track positioning.

However, since the deformation of the piezoelectric element is very small, it is necessary to use a thick and large piezoelectric element in order to provide a sufficient deformation (displacement). This results in a large magnetic disk recording and reproducing apparatus.

It is also possible to increase the number of teeth of the click gear to realize a fine adjustment servo-mechanism of the magnetic head. This solution however, is not desirable, since first it is very difficult to manufacture a small click gear having a large number of teeth, and second, since it is necessary to increase the diameter of the click gear, resulting in the need to use of a reduction gear.

SUMMARY OF THE INVENTION

The primary object of the present invention is to eliminate the problems of the prior art mentioned above, by providing a small magnetic disk recording and reproducing apparatus having a simple servo-mechanism for adjusting the position of the magnetic head which can accurately stop the magnetic head at a desired on-track position.

To achieve the object mentioned above, according to the present invention, there is provided a magnetic disk recording and reproducing apparatus comprising a carriage that supports a magnetic head moving in radial directions of a magnetic disk which is rotatably supported on a body of the apparatus, a cam which is rotatable about a rotational shaft to control the radial position of the magnetic disk, an intermittent rotation mechanism which intermittently rotates the cam by a predetermined angular displacement, a click gear which drives the cam, a click lever which is provided, on one end, with a pawl which can disengageably engage with the click gear to restrict the angular position of the click gear, a fine adjustment member which movably supports one end of the click lever, and driving means for moving the fine adjustment member to adjust the angular position of the click gear, in accordance with the track position of the magnetic head relative to the magnetic disk.

With this arrangement, the magnetic head can be brought into an accurate on-track position with respect to the tracks of the magnetic disk by a simple adjustment of the click lever.

Preferably, the click lever is rotatable about a pivot shaft at its opposite end, and the fine adjustment member rotatably supports the pivot shaft of the click lever.

Preferably, the fine adjustment member has an adjusting lever which is pivoted at one end to a body of the magnetic disk recording and reproducing apparatus. The pivot shaft of the click lever can be supported by the opposite end of the adjusting lever.

Preferably, the driving means includes a piezoelectric member which is provided between the adjusting lever and the body. The angular position of the adjusting lever can be controlled by the value and polarity of a voltage applied to the piezoelectric member to effect the fine adjustment of the pivot shaft of the click lever.

Preferably, the adjusting lever is biased in the direction of the compression of the piezoelectric member by a spring means. It is possible to give an initial bias to the piezoelectric member to stabilize the position thereof.

The fine adjustment member and the driving means can be embodied by a common bimorph type of piezoelectric element (bimorph cell) which is connected at one end to the body of the apparatus and which supports at the opposite end the pivot shaft of the click lever. The bimorph cell has, as is well known, an elastically deformable metal plate which has on its opposite side faces plate like piezoelectric elements, so that the elastic metal plate can be deformed in opposite directions, depending on the value and polarity of the voltage applied to the plate like piezoelectric elements to perform the fine adjustment of the displacement of the pivot shaft of the click lever.

BRIEF DESCRIPTION OF THE DRAWINGS

The invention will be described below in detail with reference to the accompanying drawings, in which like reference numerals represent similar parts throughout the several views, and wherein:

FIG. 2 is a plan view of FIG. 1;

FIG. 3 is a front elevational view of a click lever and a driving lever according to another aspect of the present invention;

DETAILED DESCRIPTION OF THE INVENTION

Figure 1:
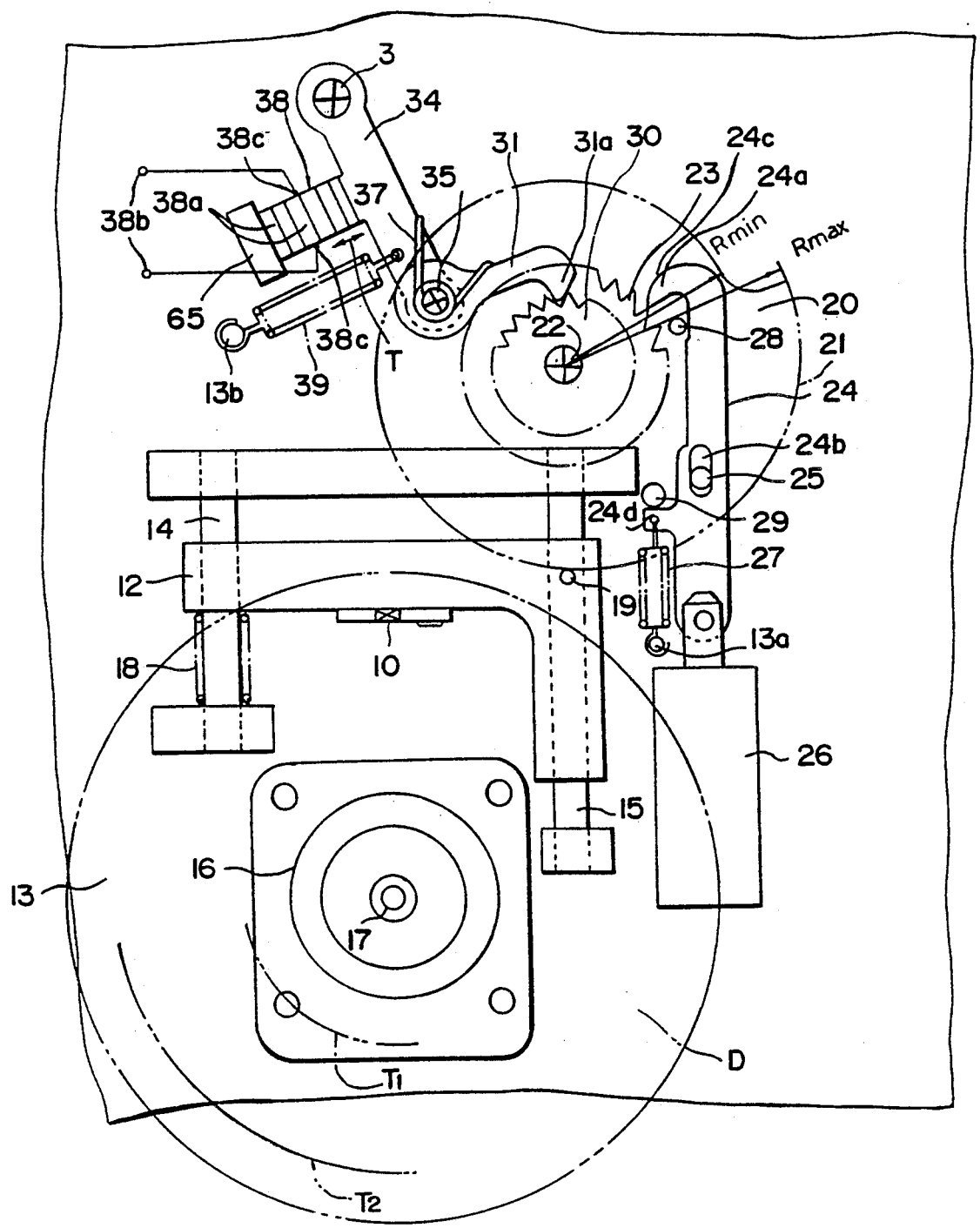
FIG. 1 is a front elevational view of a main part of a magnetic head driving portion of a magnetic disk recording and reproducing apparatus according to one aspect of the present invention.
Figure 7:
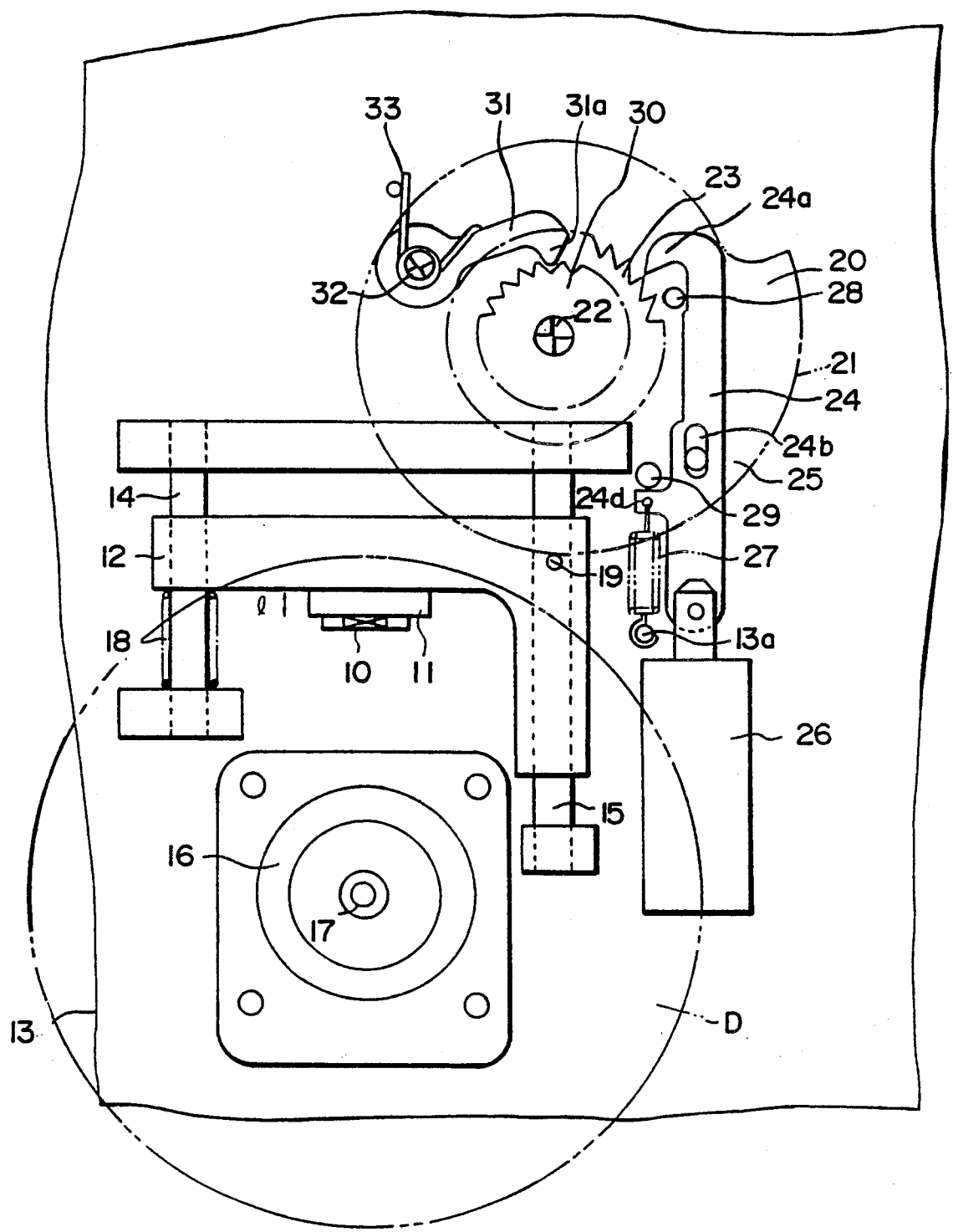

Note that in FIGS. 1 and 2, components corresponding to those in FIG. 7 are designated with the corresponding numerals.

The magnetic recording and reproducing head 10 is directly secured to the generally L-shaped carriage 12. The carriage 12 is slidably mounted to the parallel guide rods 14 and 15 which are provided on the body 13, so that the carriage 12 can move along the guide rods 14 and 15. The magnetic head 10 linearly moves to come away from and close to the rotational shaft 17 of the magnetic disk driving motor 16, in a plane parallel with the magnetic disk D which is supported by the rotational shaft 17.

The carriage 12 is continuously biased by a compression coil spring 18 which is wound around the guide rod 14, so that the magnetic head 10 tends to move away from the magnetic disk driving motor 16.

Above the carriage 12, shown in FIG. 1, is a rotatable plate cam 20 which is rotatable about a shaft 22 on the body 13. The plate cam 20 has a peripheral cam surface 21 against which a pin 19, provided on the carriage 12, is continuously pressed by the spring force of the compression coil spring 18. The plate cam 20 has a ratchet gear (wheel) 23 and a click gear 30 which are both coaxial to the shaft of the plate cam 20 so as to rotate together.

The ratchet gear 23 is engaged by a pawl 24a formed on the front end of a feed lever 24. The feed lever 24 is provided with an elongated hole 24b which is formed at an intermediate portion thereof and which extends substantially in parallel with the guide rod 14. A pin 25 provided on the body 13, is fitted in the elongated hole 24b, so that the feed lever 24 can rotate and linearly move. The linear movement of the feed lever 24 is performed by a plunger solenoid 26, which is pivoted to a lower end thereof in FIG. 1. The feed lever 24 is continuously biased by a tension spring 27 which is provided between and connected to a pin 13a provided on the body 13 and an arm 24c which is formed on the feed lever 24, so that the ratchet pawl 24a is urged into engagement with the ratchet gear 23. Thus, when the plunger solenoid 26 is activated with one pulse, one reciprocal movement of the feed lever 24 in a direction parallel with the guide rod 14 takes place against the spring force of the tension spring 27. Upon the upward movement of the feed lever 24 in FIG. 1, the curved rear surface portion 24c of the ratchet pawl 24a slides and runs on the tooth thread of the ratchet gear 23. On the contrary, when the feed lever 24 moves downward, the pawl 24a comes into engagement with the ratchet gear 23 to rotate the ratchet gear 23 by one pitch corresponding to one tooth of the ratchet gear 23 in the clockwise direction in FIG. 1. Stop pins 28 and 29 are provided on the body 13 to restrict the upper and lower terminal end movement of the feed lever 24.

The click gear 30 is engaged by a click pawl 31a which is formed at the front end of a click lever 31. The click lever 31 is pivoted, at its rear end, to a front end of a fine adjustment lever 34 through a pivot shaft 35. The fine adjustment lever 34 is rotatably connected at its rear end to the body 13 through a shaft 36. A torsion spring 37 is wound around the shaft 35 of the click lever 31 to bias the click lever 31, so that the click pawl 31a continuously comes into engagement with the click gear 30.

Between the fine adjustment lever 34 and a piezoelectric element supporting block 65 on the body 13 is provide a piezoelectric element 38 which is actuated to rotate the fine adjustment lever 34 about the shaft 36. The piezoelectric element 38 comprising a number of laminated piezoelectric plates 38a, 38a, ..., connected to a voltage supply source (not shown) through terminals 38b. Each plate like piezoelectric element 38a varies in thickness, i.e., each deforms in the direction T of thickness, when the voltage is supplied between end electrodes 38c of the piezoelectric element 38 through terminals 38b. The variation (deformation) of the thickness depends on the value and the porality of the voltage to be supplied. The deformation of the piezoelectric element 38 causes the fine adjustment lever 34 to rotate about the shaft 36 by a desired angular displacement corresponding to the deformation.

A tension spring 39 is positioned between the fine adjustment lever 34 and a pin 13b provided on the body 13 which continuously biases the fine adjustment lever 34 in a direction of the compression of the piezoelectric element 38 to exert an initial bias on the piezoelectric element 38 to thereby stabilize the position thereof.

As can be understood from the foregoing, the click lever 31 rotates about the shaft 35 to bring the click gear 30 (and accordingly, the plate cam 20) into a predetermined angular position (click stop position). However, when the click gear 30 rotates in the clockwise direction, the click pawl 31a is disengaged from the tooth groove of the click gear 30 in which the click pawl 31a has been engaged and rides on the adjacent tooth and comes into engagement in the adjacent tooth groove to keep the click gear 30 in the engagement. Note that the position in which the click pawl 31a and the click gear 30 are engaged with each other, and accordingly the click stop position of the click gear 30 and the plate cam 20, depends on the position of the shaft 35 which varies in accordance with the rotation of the fine adjustment lever 34 about the shaft 36. Namely, the position of the shaft 35 of the click lever 31 can be adjusted by the piezoelectric element 38 through the fine adjustment lever 34.

The profile of the peripheral cam surface 21 of the plate cam 20 describes an Archimedes' spiral in which a difference between the largest diameter $R_{max}$ and the smallest diameter $R_{mim}$ is substantially identical to a difference in radius between the innermost recording track $T_1$ and the outermost recording track $T_2$, of the magnetic disk D. The number of the teeth of the track gear 22 and the click gear 30 is identical to the number of the recording tracks of the magnetic disk D. Therefore, the rotation of the plate cam 20 by an angular displacement corresponding to one tooth of the ratchet gear 23 causes the displacement of the carriage 12 and accordingly the magnetic head 10 corresponding to one recording track.

The magnetic disk recording and reproducing apparatus of the present invention operates as follows.

Upon recording and reproducing the magnetic disk D, the plunger solenoid 26 is actuated a predetermined number of times to rotate the plate cam 20 by a predetermined angular displacement in the clockwise direction in order to move the carriage 12, so that the magnetic head 10 is brought into a predetermined position (on-track position) in which the magnetic head 10 is located above a desired track of the magnetic disk D.

Figure 4:
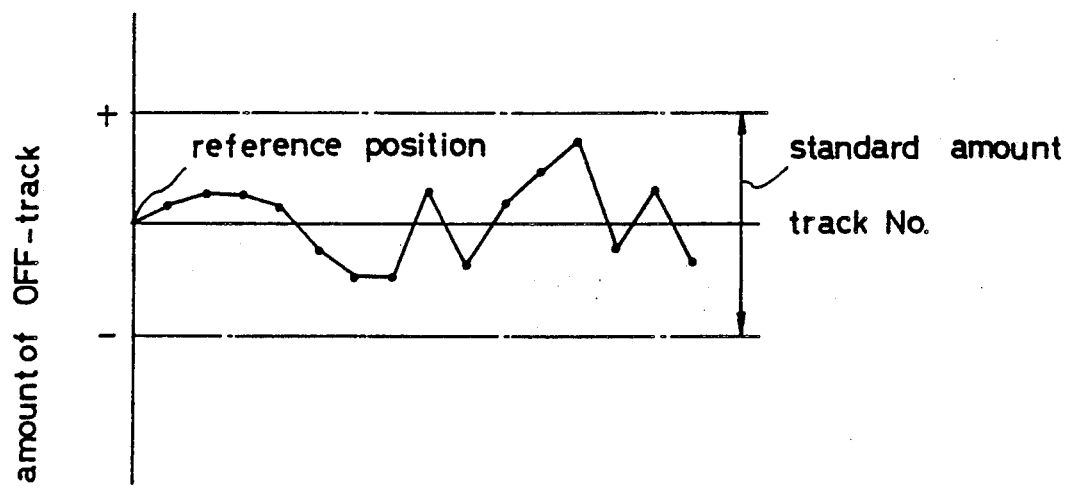
FIG. 4 is a diagram showing the deviation (amount of off-track) of the magnetic head from tracks of the magnetic disk upon recording.

Upon recording, no electric power is supplied to the piezoelectric element 38 and the fine adjustment lever 34 is located at a balance position in which the spring force of the tension spring 39 is balanced with the compression stress of the piezoelectric element 38, so that the angular position of the click gear 30 (plate cam 20) is restricted by the click lever 31. During this recording operation, the magnetic head 10 may be located in the off-track position, i.e. the magnetic head 10 is deviated from the desired recording track, as can be seen in FIG. 4.

Figure 5:
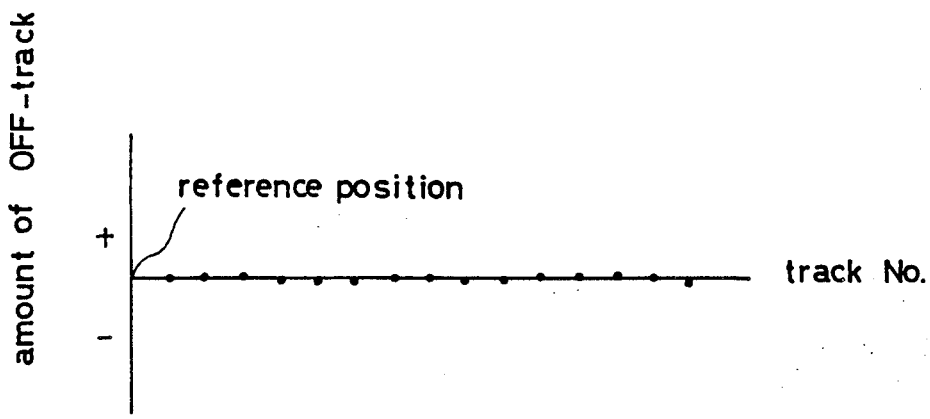
FIG. 5 is a diagram showing the deviation (amount of off-track) of the magnetic head from tracks of the magnetic disk upon recording, according to the present invention.
Figure 6:
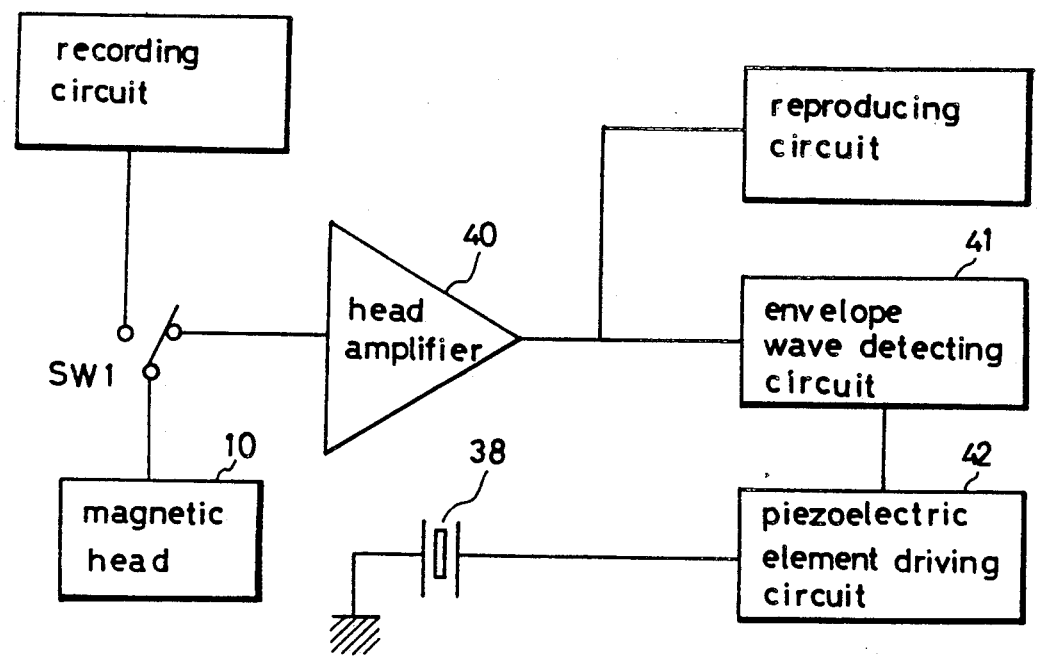
FIG. 6 is a block diagram showing a control circuit according to one aspect of the present invention; and, FIG. 7 is a front elevational view of a main part of a magnetic head driving portion in a known magnetic disk recording and reproducing apparatus.

Referring to FIG. 6, upon reproducing the magnetic disk D, the signal read by the magnetic head 10 is amplified by a head amplifier 40 and is detected by an envelope wave detector 41 to detect the amount of off-track, so that a voltage corresponding to the amount of off-track is applied to the piezoelectric element 38 by a piezoelectric element driving control circuit 42 to compensate for the off-track recording. As a result, the piezoelectric element 38 is deformed to rotate the fine adjustment lever 34 in order to correct the off-track of the magnetic head 10. Consequently, the position of the shaft 35 of the click lever 31 is varied to displace the click pawl 31a, resulting in the rotation of the click gear 30 with which the click pawl 31a engages. Thus, the click stop position (angular position) of the plate cam 20 is varied to realize an accurate on-track position of the magnetic head 10 (FIG. 5).

FIG. 3 shows a modified embodiment of the present invention. In this embodiment, both the fine adjustment member of the shaft 51 of the click lever 50 and the driving means thereof are realized by a common bimorph type piezoelectric element 52. The click lever 50 is pivoted to one end (front end) of the bimorph cell 52 which is secured at its opposite end to the body 13 through the shaft 51.

The bimorph cell 52, as is well known, has an elastically deformable metal plate 53 which is provided, on its opposite sides, with plate like piezoelectric elements 54 and 55 secured thereto. When the bimorph cell is activated, one of the piezoelectric elements 54 and 55 stretches and the other contracts, so that the front end of the bimorph cell 52 is elastically deformed in the directions shown by arrows B in FIG. 3. The elastic deformation of the bimorph cell 52 causes the shaft 51 of the click lever 50 to move, so that the click stop position of the plate cam 20 can be varied in a stepped fashion to realize an on-track positioning of the magnetic head 10, similar to the aforementioned embodiment.

I claim:

1. A magnetic disk recording and reproducing apparatus, comprising:
   a carriage which is adapted to support a magnetic head, said magnetic head being adapted to move in radial directions with respect to a magnetic disk which is rotatably supported on a body of said apparatus;
   a cam that is rotatable about a rotational shaft to move said carriage;
   an intermittent rotation mechanism for intermittently rotating said cam over a predetermined angular displacement, said intermittent rotation mechanism comprising:
      a ratchet gear coaxially supported by said cam, said ratchet gear and cam being adapted to rotate together, and a feed lever which is movably supported by said body so as to linearly reciprocate in a direction substantially parallel to the direction of movement of said carriage;
   a click gear adapted to drive said cam;
   a click lever having a pawl at a first end of said click lever, which pawl can disengageably engage said click gear in order to restrict the angular position of said click gear;
   a fine adjustment member which movably supports said first end of said click lever; and
   driving means for moving said fine adjustment member to adjust the angular position of said click gear in accordance with the track position of said magnetic head relative to said magnetic disk.

2. An apparatus according to claim 1 wherein said click gear is coaxial to said cam.

3. An apparatus according to claim 1, wherein said click gear has a periphery and said driving means comprises means for adjusting the position of a pivot shaft of said click lever about the periphery of said click gear.

4. An apparatus according to claim 1, wherein said fine adjustment member and said driving means comprise a common bimorph type of piezoelectric element which is connected at one end to said body and which is adapted to support, at an opposite end of said piezoelectric element, a pivot shaft of the click lever.

5. An apparatus according to claim 1, wherein said cam comprises a plate cam having a peripheral cam surface.

6. An apparatus according to claim 5, wherein said carriage has a pin which bears against said peripheral cam surface of said plate cam.

7. An apparatus according to claim 6, wherein said peripheral cam surface has a profile described by Archimedes' spiral, wherein the difference between the largest diameter portion of said spiral and the smallest diameter portion of said spiral is equal to the difference in radius between an innermost recording track and an outermost recording track of the magnetic disk.

8. An apparatus according to claim 1, wherein said fine adjustment member comprises an adjusting lever which is pivoted at a first end to said body, a pivot shaft of the click lever being rotatably supported by the opposite end of the adjusting lever.

9. An apparatus according to claim 8, wherein said driving means comprises a piezoelectric element which is provided between, and connected to, the adjusting lever and the body.

10. An apparatus according to claim 9, wherein said piezoelectric element comprises a plurality of laminated piezoelectric plates.

11. An apparatus according to claim 9, further comprising a spring positioned between said adjusting lever and said body, said spring comprising means biasing said adjusting lever in a direction in which said piezoelectric element is adapted to be compressed.

* * * * *